INVENTORS.
CARL F. AVERY, JR.
ERNEST A. PEARSON
LLOYD V. WINTERS

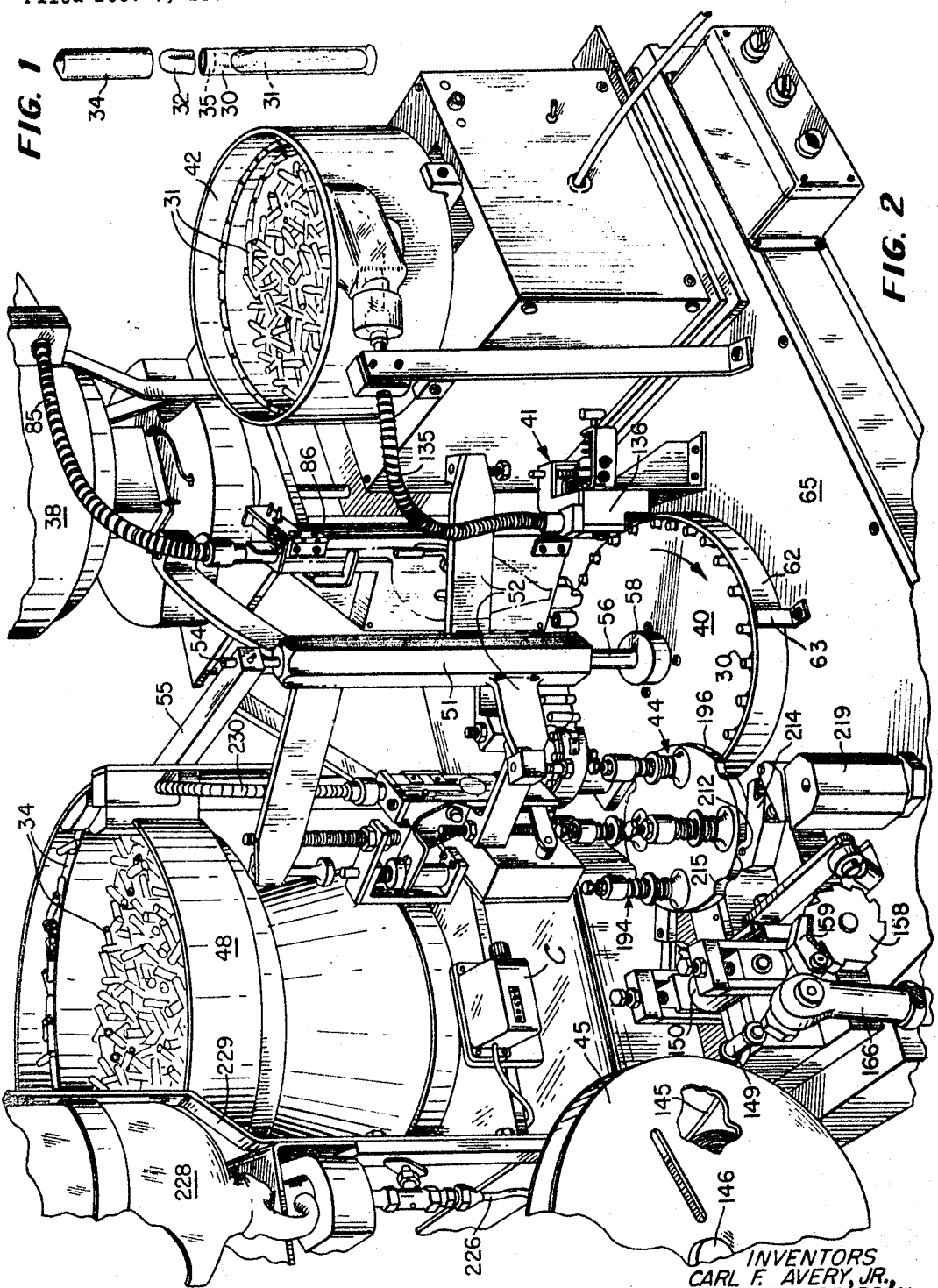

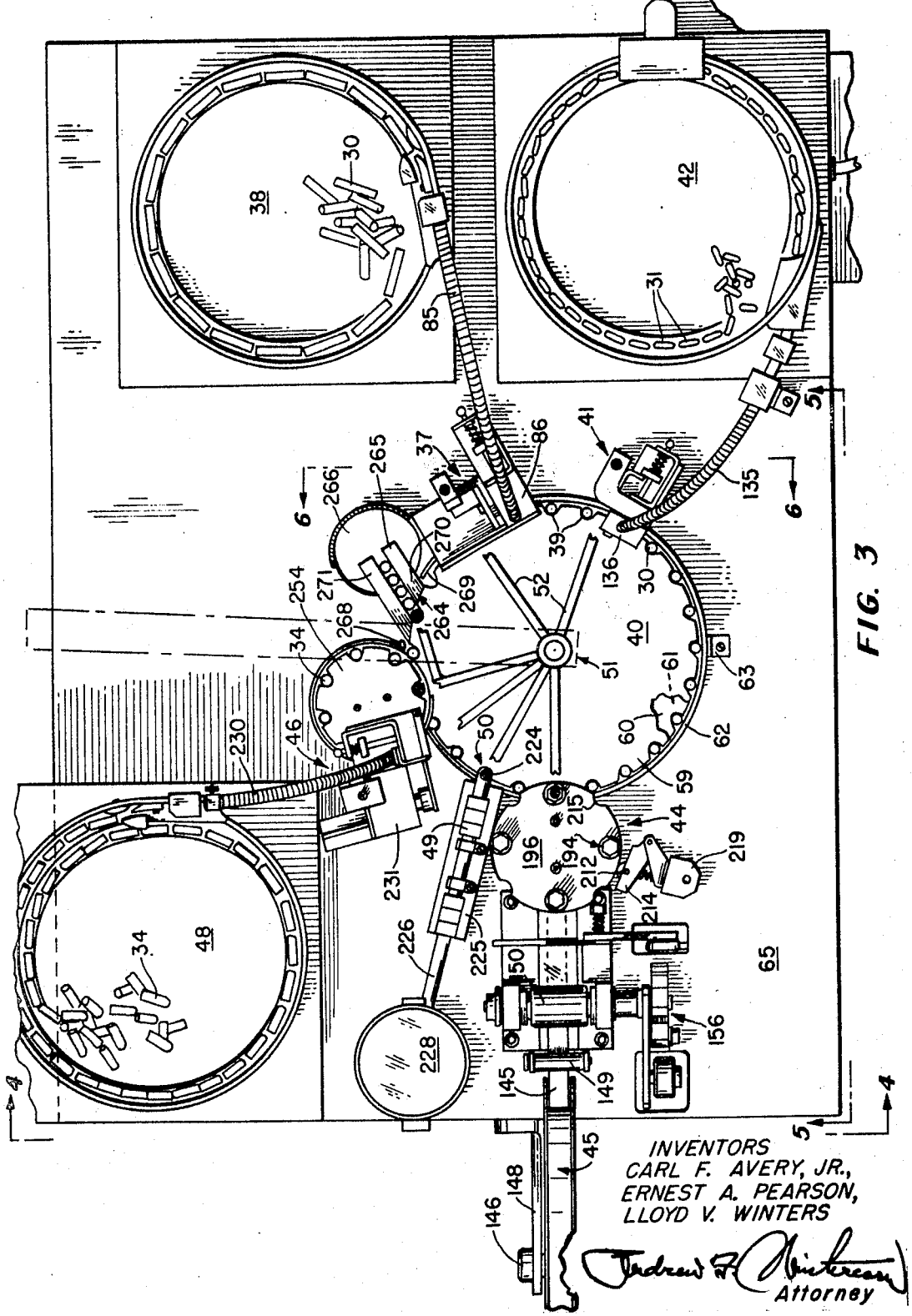

By [signature] Attorney

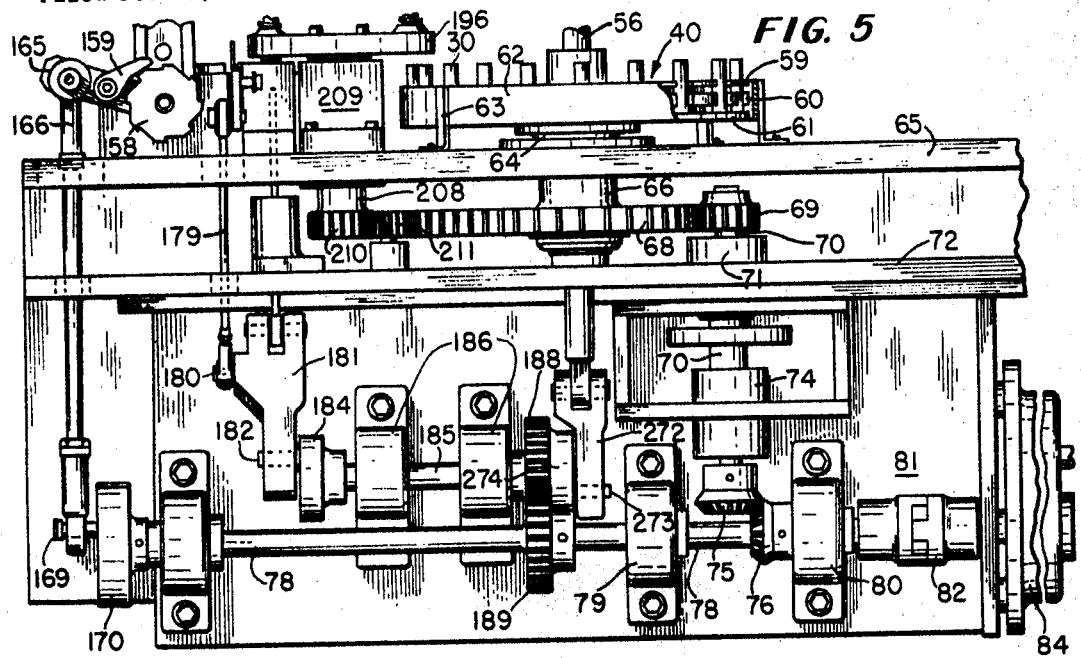
FIG. 5
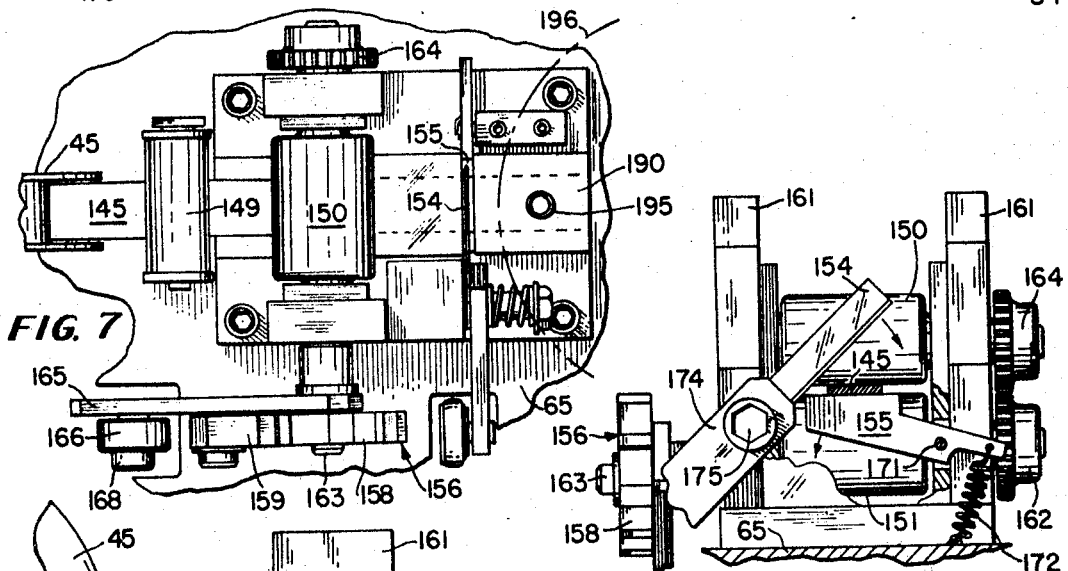
FIG. 7
FIG. 8
FIG. 9
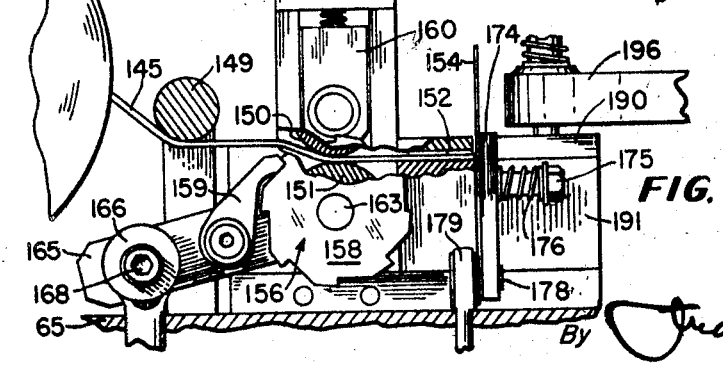
INVENTORS
CARL F. AVERY, JR.,
ERNEST A. PEARSON,
LLOYD V. WINTERS
By *Frederick F. Wintercorn*
Attorney

INVENTORS.
CARL F. AVERY, JR.,
ERNEST A. PEARSON,
LLOYD V. WINTERS

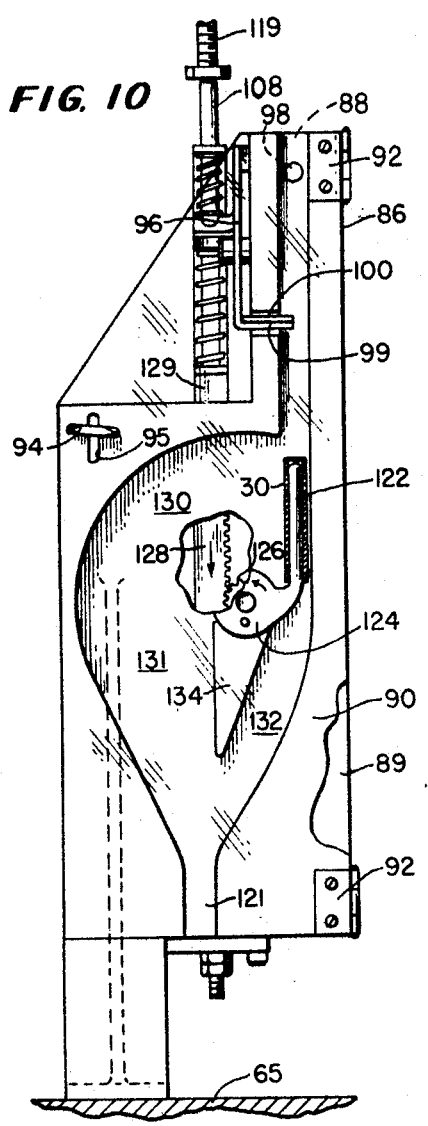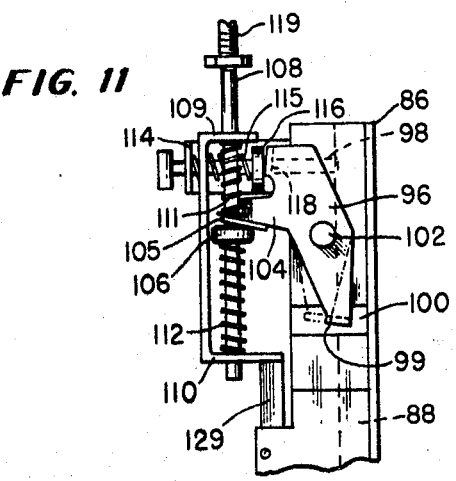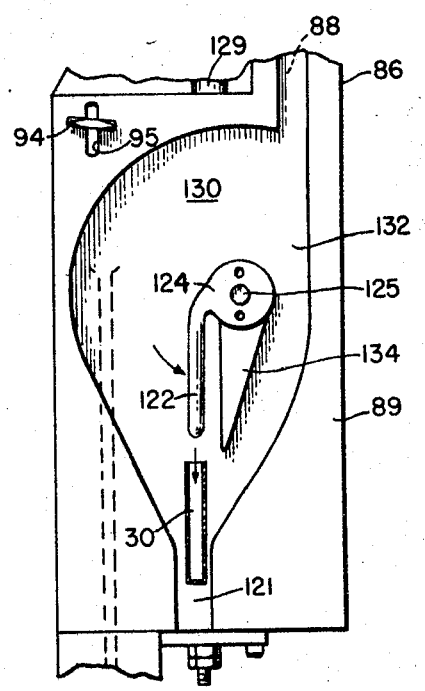

Aug. 19, 1969 C. F. AVERY, JR., ET AL 3,461,535
ROTARY TYPE SWAB ASSEMBLING MACHINE
Filed Dec. 7, 1966 8 Sheets-Sheet 7
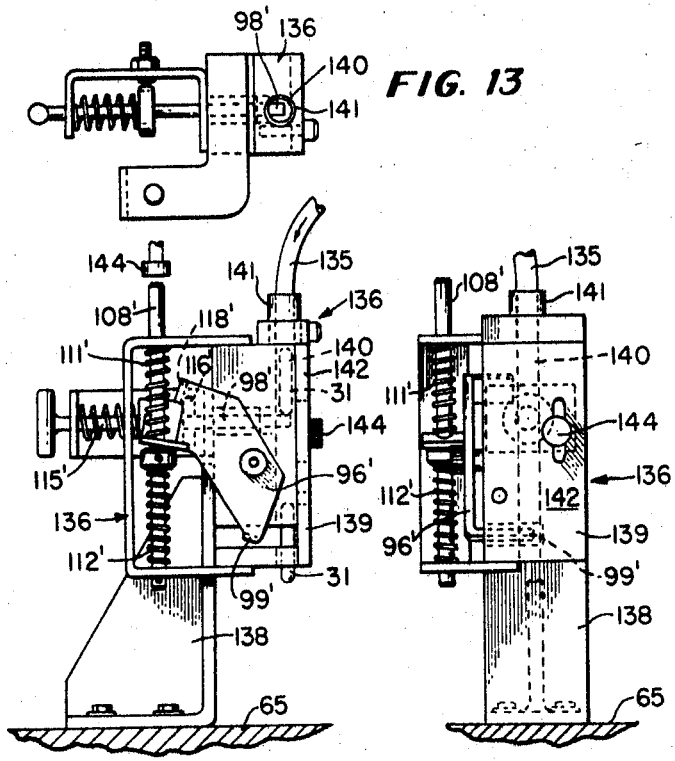
FIG. 13
FIG. 14    FIG. 15
INVENTORS
CARL F. AVERY, JR.,
ERNEST A. PEARSON,
LLOYD V. WINTERS
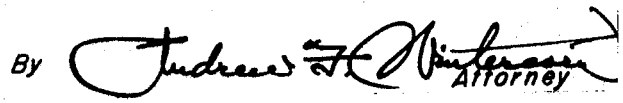
By
Attorney Aug. 19, 1969  C. F. AVERY, JR., ETAL  3,461,535
ROTARY TYPE SWAB ASSEMBLING MACHINE
Filed Dec. 7, 1966  8 Sheets-Sheet 8
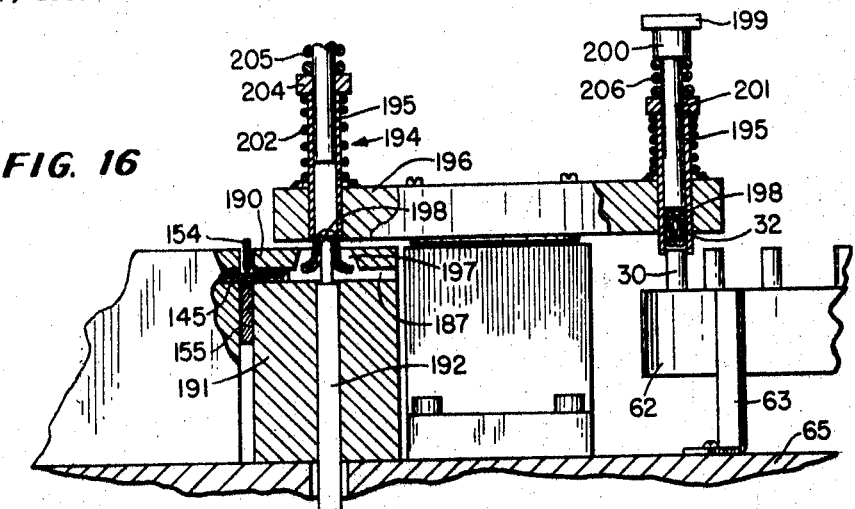
FIG. 16
FIG. 17
FIG. 18
FIG. 19  FIG. 20  FIG. 21
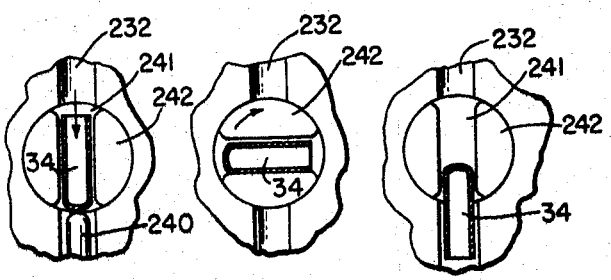
INVENTORS
CARL F. AVERY, JR.,
ERNEST A. PEARSON,
LLOYD V. WINTERS
By  Attorney

3,461,535
Patented Aug. 19, 1969

3,461,535
ROTARY TYPE SWAB ASSEMBLING MACHINE
Carl F. Avery, Jr., Ernest A. Pearson, and Lloyd V. Winters, Rockford, Ill., assignors, by mesne assignments, to Medical Supply Company, Rockford, Ill., a corporation of Missouri
Filed Dec. 7, 1966, Ser. No. 599,841
Int. Cl. B23p *19/00*
U.S. Cl. 29—208                    27 Claims

ABSTRACT OF THE DISCLOSURE

This machine has a round table which is indexed from station to station, receiving at one station a closed end tube, open end up, for a medicament applicator, into which is fed at the next station a frangible ampule or vial of liquid medicament, and at a following station a cylindrical swab is inserted. A droplet of liquid solvent is added at the next station which, before its evaporation, helps cement the swab in place by rendering tacky a coating on the inside of the tube at the open end. A tubular cover is applied at the next station, after which the completed article is discharged at a last station. All assembling operations take place simultaneously on different tubes at the various stations around the table. Thus, while one tube is being fed onto the table at the first station, an ampule is fed into a second tube at the second station, and a swab is being fed into a third tube over an ampule at a third station, while a swab in a fourth tube is being wetted by solvent at fourth station for cementing of the swab to the tube lining, and still another tube is receiving a cap fed thereto at a fifth station, while a sixth completely assembled applicator is being ejected at the sixth station. An actuator reciprocates vertically relative to the center of and in timed relation to the indexing of the table and has radially extending arms spaced circumferentially and vertically to operate the feed means for the respective stations.

---

This invention relates to an apparatus for assembling articles and, more particularly, small generally cylindrical capped articles, such as medication applicator swabs having an elongated tubular body enclosing an inner frangible vial of medicament liquid for wetting an applicator swab inserted in an open end of the tubular body, the swab being covered by a protective cap telescoped on the body.

Accordingly, a general object of the invention is to provide a machine, which, as contrasted with the prior art, is more efficient in its assembling of medication applicator swabs of the foregoing kind.

A more specific object of the invention is to provide an assembly machine, which is more compact and takes up less floor space, by arranging a succession of assembly stations about the circumference of a turntable.

Another object of the invention is to provide a simple mechanical actuator for operating mechanisms at assembly stations in timed relationship to the advancement of the turntable.

A further object of the invention is to provide a novel apparatus for forming swabs of a generally cylindrical shape from a flat strip or tape of absorbent material carried on a reel.

A still further object of the invention is to provide a swab forming and applying apparatus for forming cylindrical swabs from flat strips of the tape and inserting the same into the open ends of the tubular bodies.

Other objects and advantages of the invention will be apparent from the following description taken in connection with the accompanying drawings, in which:

FIG. 1 is a perspective of a medication applicator swab, showing the four components in somewhat disassembled relation, the medicament containing vial or ampule being visible through the transparent container;

FIG. 2 is a perspective of the swab assembling machine or apparatus, one end portion of which is broken away to conserve space;

FIG. 3 is a plan view of FIG. 1;

FIG. 5 is a front view of the left hand portion of the machine, taken on line 5—5 of FIG. 3;

FIGS. 7–9 are further fragmentary views pertinent to the tape feed and cutting means;

FIGS. 10–12 are three related views pertinent to the tube or body feed;

FIGS. 13–15 are three related views pertinent to the vial or ampule feed;

FIG. 16 illustrates the two-stage swab insertion and forming;

FIGS. 17 and 18 are related views pertinent to the cap feed; and

FIGS. 19 to 21 illustrate the cap righting operation.

The same reference numerals are applied to corresponding parts throughout these views.

Figure 4:
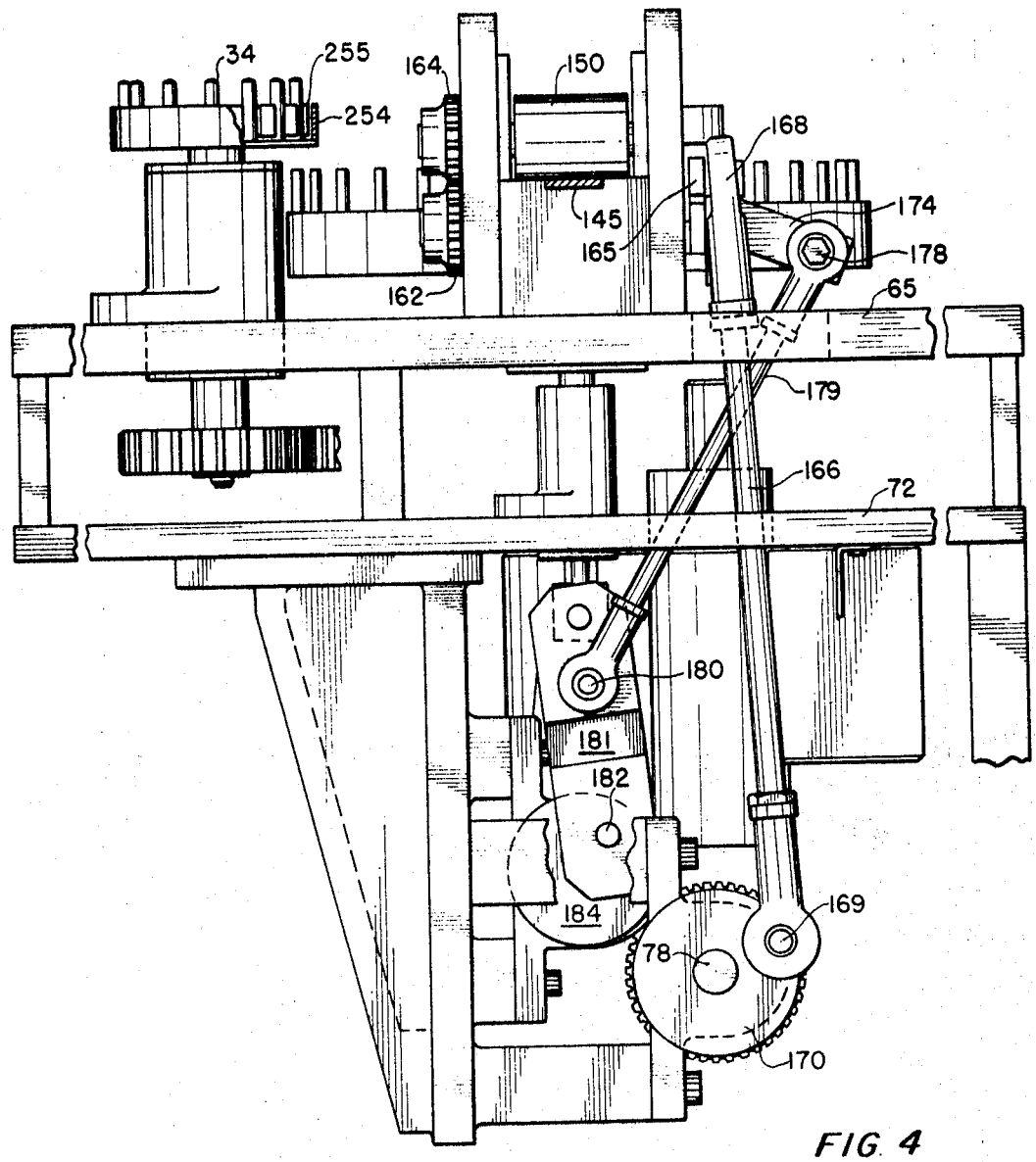
FIG. 4 is a side view, on the line 4—4 of FIG. 3.

As shown in the drawings, for purposes of illustration, the invention is embodied in an apparatus for assembling small capped generally cylindrical articles such as medication applicators having a transparent plastic body or tube 30 enclosing an easily frangible glass via or ampule 31 (FIGURE 1) containing a liquid medication, the vial being disposed beneath an applicator swab 32 of an absorbent material, the projecting end of which, in turn, is covered by a removable cap 34 telescoped over the swab and tube. To apply the medicament, the cap 34 is removed and the vial is broken by applying finger pressure on the side wall of the protective tube to break the ampule 31, which then releases the liquid to saturate the swab 32 for application to a wound. See Davies Patent 1,822,566, which first disclosed this broad idea. All glass fragments of the ampule are retained in the tube below the swab. Herein, the swab is disclosed as held against being pushed out against the cap by adhesion to the tube, due to an acetate lining indicated at 35 inside the tube which is rendered tacky, as by application of a liquid, such as acetone, to the swab 32 at the time of assembling the article.

In accordance with the invention, a large supply of empty bodies or tubes 30 are disposed at the first station 37 in a hopper 38 (FIGS. 2 and 3) and are fed through a suitable feed means and dropped individually into a receptacle 39 on the rim of a table 40 which is adapted to be indexed and carries the tube to and through subsequent stations until the applicator is completely assembled in one turn of the table in the clockwise indexing indicated by the arrows in FIGS. 2 and 3. At an ampule delivery station 41, ampules 31 are fed from a supply hopper 42 through a suitable feeding means and are dropped one by one into the open ends of the tubes passing through the station. At a swab making and insertion station 44, an absorbent material such as cotton in tape form is taken from a reel 45 and is cut to rectangular form and formed into a cylindrical swab 32 and inserted into the open end of a tube 30 moving through this station. At a capping station 46, caps 34 are delivered one by one from a hopper 48 by a suitable feeding means and telescoped over the swab and upper end of the tube to form a completed applicator. Herein, a solvent is released from a valve 49 to wet the swab at a solvent delivery station 50 between the swab delivery station 44 and the capping station 46.

In accordance with the present invention, the respective assembly stations are spaced circumferentially about the table 40 and this means a big saving in the cost of operation as it enables a single operator to tend the machine and it results also in considerable economies in the amount of floor space necessary for the machine, as contrasted with the prior art where the stations were spaced along one line, and this arrangement also permits the use of a simple central mechanical actuator 51 (FIG. 2) for operating mechanisms at the respective stations in timed relationship to the movement of the tubes 30 into and through the aforementioned stations. In the present instance, the actuator is in the form of a vertical bar having a plurality of radial arms 52 spaced angularly and vertically along the bar to operate the various mechanisms at the various stations in the proper timed relation. The actuator bar is guided for vertical reciprocatory movement by an integral upper pin 54 received in a vertical bearing on the outer end of a support bracket 55 and by an integral shaft 56 on the lower end of the actuator bar extending into a bore in a center hub 58 on the table 40, namely, on the axis of indexing rotation of the latter. Any suitable means may be provided for reciprocating the actuator 51 in timed relation to the indexing of the table 40. FIG. 5 shows our preferred drive train.

Figure 6:
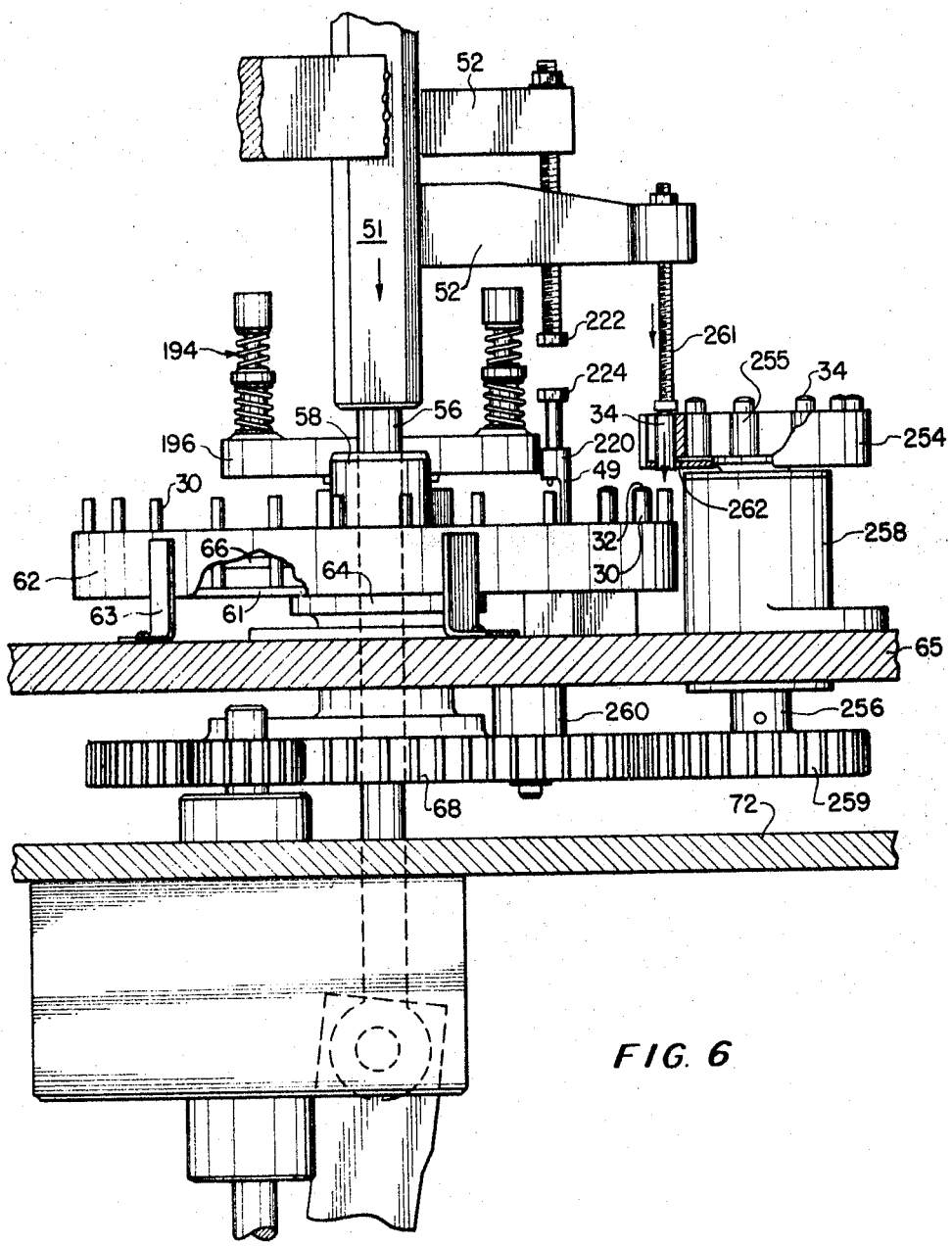
FIG. 6 is a side view of that portion of FIG. 3, indicated by the line 6—6 in that figure.

To hold and advance the tubes 30 through their respective stations, the table 40 is provided with a circular series of the receptacles 39 spaced evenly about its circumference. The table is formed by three coaxially spaced horizontal discs 59, 60 and 61 spaced vertically from one another and secured to the central hub 58. A stationary ring 62 closely encircles substantially the entire periphery of the plates and is fastened by brackets 63 (FIG. 2) to extend upwardly from and adjacent to the periphery of the table 40. The receptacles 39 are formed by vertically alined and substantially semi-circular notches in the upper and intermediate plates 59 and 60 with the notches opening into the peripheral edge of the discs. The ring 62 holds the tubes from moving radially outwardly from the notches while the bottom ends of the tubes rest on the outer unnotched edge portion of the lower plate 61, as best seen in FIGS. 5 and 6.

The table 40 is supported for indexing rotation by a bearing 64 (FIG. 5) mounted in a main horizontal frame plate 65 of the machine, and a driving shaft 66 for the table extends down through the bearing and plate and is fixed for rotation with a large main central driving gear 68. The latter has teeth meshed with a vertical pinion gear 69 fixed to a vertical shaft 70 extending through a bearing 71, a lower horizontal frame plate 72, and a bracket 74, to a bevel gear 75. This bevel gear is meshed with and driven by a bevel gear 76 on a main drive shaft 78 supported for rotation about a horizontal axis in spaced bearings in bearing retainers 79 and 80 fixed to a vertical frame plate 81. The main driving shaft is connected at its right end (FIG. 5) through a coupling 82 to a sprocket 84 which, in turn, is driven by a belt (not shown) and motor (not shown). Herein, the main driving shaft 78 turns continuously to drive the pinion 69 and driving gear 68 to turn the table 40 at a predetermined rate of rotation.

In order to feed a number of tubes 30 to the table at a relatively high rate of speed, a large number of tubes are disposed in the vibration type automatic feed hopper 38, the operation of which is well known, and which, as seen in FIG. 3, causes the tubes to assume and move in an end-to-end relationship to a chute that is provided in the form of a flexible tube 85 (FIG. 2) curving downwardly toward a vertical housing 86 having means for gating and orienting or righting the tubes. The discharge end of the flexible tube 85 delivers the tubes, while disposed end-to-end in a column, to the upper end of a vertical inlet chute or passageway 88 (FIG. 11) in the housing. The latter is formed by a vertical groove in a vertical housing wall 89 which is covered by a flat face plate 90 of transparent material connected by spaced hinges 92 (FIG. 17) to pivot flush against the housing wall and enclose one side of the groove 88. If a tube jams in the housing, the operator can observe the jammed condition through the transparent face plate 90 and open it up after turning the head of latch 94 into aligned relation to a slot 95 in the face plate.

To release the bodies one at a time and in timed relationship to the movement of the table 40, gate means in the form of a pivoted bellcrank 96 and horizontally disposed slidable pin 98 (FIGS. 11 and 12) are disposed in the upper part of the housing. A blocking finger 99 on the lower end of the bellcrank 96 is disposed to move sideways in a horizontal slot 100 from a non-blocking or release position rearward of the inlet chute to a blocking position in which the finger is disposed in the chute and supports the lower end of a tube 30. The bellcrank is pivoted on a horizontal pin 102 on the housing for movement from the release position shown in dotted lines in FIG. 11 to the blocking position shown in full lines in the same figure in which the finger has swung counterclockwise into the inlet chute. To pivot the bellcrank 96 between its blocking and release positions, the latter is formed with an arm 104 having a horizontal offset 105 disposed above and in engagement with a collar 106 on a spring biased actuating rod 108. The latter extends vertically with its upper and lower ends projecting through and guided by vertically spaced bracket legs 109 and 110. An upper coiled compression spring 111 encircles the actuating rod with its upper end abutting the upper bracket leg 109 and its lower end seated on the bell crank offset 105. The bellcrank finger 99 is biased to its release position by a coiled compression spring 112, which is stronger than the upper spring 111 encircling the actuating rod and disposed intermediate the collar and the lower bracket leg 110. Simultaneously, with the clockwise movement of the finger 99 and release of the lowermost tube, inner end of the holding pin 98 moves into the chute 88 to engage under the tube immediately above the tube on the finger 99 for the purpose of holding the column of tubes against dropping through the inlet chute 98 with release of the lowermost tube. The pin 98 is horizontally disposed and guided at its outer end in a bracket 114 and at its inner end by the wall of the circular bore leading to the inlet chute. The pin 98 is biased inwardly to its holding position by a coiled compression spring 115 encircling the pin and seated at one end against a portion of the bracket and at the other end against a collar 116 fixed to the pin. To shift the pin 116 to its release position, an offset cam finger 118 on the upper end of the bellcrank 96 engages the inner side of the collar 116 and forces the same outwardly, or to the left as viewed in FIG. 11, to compress its spring 115. When an actuator plunger 119 depresses the rod 108 and compresses the spring 112, the bellcrank 96 swings its finger 99 into the blocking position and simultaneously the upper offset 118 of the bellcrank engages the collar 116 on the pin 98 and forces the latter to withdraw from its holding position under a tube 30 in the chute 88 whereupon the lowermost tube drops onto the finger 99. When the actuator moves upwardly, the stronger spring 112 compresses the spring 111 and pivots the bellcrank 96 clockwise (FIG. 11) to move the finger 99 to its release position and simultaneously move the pin 98 inwardly under the following tube.

The tubes 30 being released at the gate 99 are randomly oriented with either end up as they leave the upper inlet portion of the chute 88 in the housing. To properly orient all of the tubes 30 with their open ends up as they leave housing 86 through the bottom exit passage 121, means are provided for orienting tubes comprising a finger 122 onto which telescope those tubes 30 having their open ends down as they leave the gate 99. The finger 122 is pointed vertically upward and in alignment with the entrance passageway 88 to receive in telescoped relationship a tube dropping downwardly from the gate 99.

The finger is laterally offset from and connected at one end to a hub 124 fixedly mounted on a horizontal pin 125 on which is connected a gear 126 (FIG. 10) meshed with a vertically movable rack 128. The latter is formed on the lower end of a vertical bar 129 guided in a slot in the housing and fastened at its upper end to the lower leg 110 of the gate bracket which, as previously stated, is movable vertically by the plunger 119. The rack is effective to turn the finger 122 counterclockwise, as seen in FIG. 10, through approximately 180° to the position shown in FIG. 12 in which the finger is pointed downwardly and disposed in alignment with the exit passageway 121. On release of the plunger 119, the finger swings back in a clockwise direction to the position of FIG. 10, as limited by a stop (not shown). The finger 122 is free to swing in an enlarged chamber 130 which is divided into two channels 131 and 132 by a triangular partition member 134. Tubes 30 leaving the gate with their closed ends down, rest on top of the finger 122 until the latter swings out of the way, whereupon they drop down through the channel 132 directly into the exit passageway 121. Thus, the tubes 30 are always oriented with their open ends up as they are deposited into a receptacle 39 on the table 40.

The tubes 30 are advanced from their entry point 37 to the vital inserting station 41 to receive a vial or ampule 31. The latter are delivered one by one from the vibration type hopper 42 in end-to-end relationship to the upper end of a chute which is in the form of a flexible tube 135 curving downwardly to the upper end of a gate means 136 (FIGS. 13, 14, and 15). The latter is supported by a bracket 138 secured to and extending upwardly from the plate 65 with a central housing 139 having a vertical chute or passageway 140 leading from a fitting 141 connected to the lower end of the flexible tube. The vial passageway is formed by a groove in the housing covered by a transparent face plate 142 (FIG. 15) secured by a screw 144 to the housing. In the event of a vial becoming jammed in the gate, the plate 142 is removed from the housing to expose the vials and correct the difficulty, the trouble being easily detected by the operator through the transparent face plate 142. The operation of the gate means 136 is similar to the gate means described at the first station 37 and the same but primed reference numerals are employed for corresponding parts. When an actuator plunger 144 depresses the upper end of actuating rod 108', the bellcrank 96' swings from release position of FIG. 14 to position its finger 99' in a blocking position in the chute 140. Simultaneously, the upper offset 118' on the bellcrank allows the holding pin 98' to move out of holding position, allowing the vials 31 to drop down on finger 99'. Upon upward return movement of the actuator plunger 144, the lower return spring 112' forces the actuating rod 108' upwardly and the finger 99' swings to its release position (FIG. 14) dropping the lowermost vial 31 while the offset cam 118' cams the collar 116' against action of the spring 115' causing the holding pin 98' to go into place under the next to the last vial 31 to support it and others above it in the chute 135.

As the turntable continues to index in clockwise direction, the tubes 30 having received a vial 31 are moved into and through the swab cutting, inserting and forming station 44. Cotton swabs are cut in flat sheet form from a flat tape 145 which is fed from the supply reel 45 journalled for rotation on a pivot pin 146 (FIG. 3) supported by a horizontal bracket 148 fixed to the left end of the machine. The leading end of the cotton tape or web 145 is disposed beneath a horizontal guide bar 149 (FIG. 9) and threaded between two horizontal feed rollers 150 and 151 and is inserted through a horizontal slot 152 into position between vertically swingable upper and lower cutting knives 154 and 155. The lower feed roller 151 is driven intermittently by a pawl and ratchet mechanism 156 including a toothed ratchet 158 fixed coaxially for rotation with the lower feed roller when the ratchet is turned by a driving pawl 159. The upper feed roller is journalled for rotation in pillow blocks 160 (FIG. 9) are biased by springs to slide vertically in upstanding brackets 161. A gear 162 (FIG. 9) fixed to one end of the support shaft 163 for the lower roller is meshed with a gear 164 fixed to the shaft carrying the upper feed roller to drive the two rollers at the same speed in opposite directions to feed the tape 145.

To feed the tape 145 in timed relationship to the advance of the table 40, a lever 165 carrying the pawl 159 is journalled on the shaft 163 and is oscillated by a connecting rod 166. The latter is connected to the lever by a pin 168 (FIGS. 4 and 9) and connected at its lower end by a pin 169 fixed eccentrically to a wheel 170 (FIG. 4) fixed to the left end of the main drive shaft 78, as seen in FIGS. 4 and 5. With each rotation of the wheel, the connecting rod drives the lever and pawl to turn the ratchet 158 through one step to advance one feed increment of the cotton tape 145 for severing of a swab piece.

After the tape is fed forwardly, the upper knife 154 (FIG. 8) is swung downwardly to bring its knife edge into cutting relationship with a knife edge on the lower knife 155 which swings in a counter-clockwise direction (FIG. 8) about a pivot pin 171. A spring 172 (FIG. 8) biases the outer end of the lower knife to a position to have its upper edge disposed immediately below the cotton tape 145. The upper knife is formed on one end of a lever 174 pivoted on a pivot post 175 on which is caged a properly loaded compression spring 176 (FIG. 9) engaging the knife. The lever 174 is connected by a pin 178 (FIG. 9) to the upper end of a connecting rod 179 (FIGS. 4, 5 and 9) which is connected by a pin 180 at its lower end to a drive block 181 that is pivoted by an eccentric pin 182 to a rotatable wheel 184. As seen in FIG. 5, the disc 184 is fixed on one end of a horizontal shaft 185 journaled in spaced bearings 186 fixed to the main vertical plate 81 for rotation about a horizontal axis with turning of a gear 188 carried by the shaft 185 and meshed with a driving gear 189 fixed to the main driving shaft 78. For each rotation of the main driving shaft 78, the shaft 185 rotates the disc one turn to reciprocate the connecting rod 179 and oscillate the upper cutting knife 154 about its pivot pin 175 to sever a piece of the cotton tape 145 to form a swab.

The severed piece of cotton tape lays in a horizontal channel 187 formed between vertically spaced horizontal plates 190 and 191 (FIG. 16) disposed on the frame plate 65 to the right of the knives (FIGS. 9 and 16). The flat cotton piece is centered over a plunger 192, which, at the proper time, moves upwardly to engage the central area of the cotton piece to force the central portion thereof upwardly into the open end of a tubular former 194, which herein is in the form of a vertical sleeve 195, carried on a small turntable 196. The plunger 192 has a small diameter relative to the diameter of the sleeve bore so that the cotton may form about, that is, encompass the plunger as it is forced upwardly into the sleeve. An upwardly tapered opening 197 of larger diameter than and concentric with the sleeve bore is formed in the plate 190 to guide cotton while moving upwardly into the sleeve. The swab 32 is thus formed with an upper rounded dome 198 (FIG. 16) and a generally cylindrical body disposed vertically in the sleeve after the plunger is withdrawn.

In the present instance, four formers 194 are equally spaced about the turntable and the movement of the formers is such that one former will be disposed over the open end of a tube 30 to receive a formed swab 32 while a former diametrically opposite is disposed over the plunger 192 to receive a piece of the cotton strip, as seen in FIG. 16. For the purpose of inserting the cylindrical swab into the open end of the tube 30, an actuator plunger 199 on the actuator 51 moves down into engagement with an upper head 200 of a piston 201 having a lower end inserted in and sliding in the bore of the sleeve 195. The piston and sleeve are biased upwardly to a rest position, as seen in the left side of FIG. 16 by a coiled compression spring 202 caged between the top of the table 196 and an outwardly directed flange 204 on the upper end of the sleeve, a stronger, coiled compression spring 205 being disposed between the flange 204 and a radial shoulder 206 on the piston head 200. When the actuator plunger 199 engages the head 200 of the piston 201, the lighter compression spring 202 is compressed and the sleeve 195 moves downwardly so its lower end telescopes on the open upper end of the tube 30 as seen in FIG. 16. After the lighter spring is fully compressed, the heavier spring 206 is then compressed and the piston rod 201 moves down in the sleeve and forces the cotton swab into the open end of the tube 30 to a depth in which only the dome 198 projects above the end of the tube. When the actuator plunger moves upwardly, the springs return both the piston and the sleeve, leaving the swab wedged in the open end of the tube with the rounded top dome 198 of the swab projecting above the upper rim of the tube to serve as an applicator.

The swab carrying table 196 is secured on the upper end of a vertical shaft 208 (FIG. 5) extending downwardly through a bearing 209 fastened to the main plate 65 and, on the lower end of this shaft, is secured a gear 210 which meshes with an intermediate speed reducing gear 211 driven by the main drive gear 68 for the table 40. A roller is mounted at 212 on the outer end of an oscillatable spring pressed lever 214 to drop into one after another of a series of arcuate grooves 215 spaced about the rim of the table 196, whereby to insure close accuracy of registration of the sleeve 195 with each tube 30 prior to insertion of the swab 32. Without this registering means, slight wear on the parts would suffice to cause enough lack of registration between the sleeve 195 and the tubes 30 to give rise to danger of jamming.

After receiving a swab, each tube 30 is indexed to the station 50 to dispose the swab beneath a down-spout 220 (FIG. 6) of a shut-off valve 49 which is set to deliver a metered amount of acetone directly to the swab to render tacky the lining 35 and ensure a good cementing between the lining 35 and the swab. As best seen in FIGS. 3 and 6, an actuator plunger 222 extends over an operating plunger 224 in the shut-off valve 49 fixed by a bracket 225 to the main plate 65. A conduit 226 extends leftwardly (FIG. 3) from the shut-off valve to a liquid reservoir in the form of a bottle 228 (FIG. 2) mounted in a vertical bracket 229. Liquid acetone feeds by gravity from the bottle to the shut-off valve 49, which, when actuated by the actuator plunger 224 releases several drops of acetone on the swab disposed directly beneath the downspout valve. The solvent is quick drying so that by the time a protective cap 34 is at the next station, the swabs will have dried sufficiently to eliminate any likelihood of the swab being displaced from the mouth of the tube by pressure from the vial behind it in the dropping of the completed applicator at the discharge end of the machine.

With the swab 32 cemented in place, the tube 30 is ready to be capped by the protective cap 34 which fits over the upper end of the tube. In this instance, the caps 34 are fed from a vibratory feeder, having an open hopper 48, to and through a suitable chute in the form of a flexible tube 230 curved downwardly from the hopper to a gate and orienting means in a housing 231 (FIG. 17). The caps travel through the flexible tube 230 in end-to-end relationship and are randomly oriented with either end down as the caps leave the tube 230 and enter the upper end of a passageway defined by a vertical groove 232, provided in the vertical housing 231 that is supported on and secured to the horizontal frame plate 65. A flat, transparent cover plate 234 is hinged on the housing and covers the groove 232 and therefore allows inspection of the passage of caps through the housing, with the same objectives in mind as was described regarding the tube feed and vial feed.

To feed the caps 34 one by one from the vertical column extending upwardly through the tube 230, a gate means 235 (FIGS. 17 and 18) generally similar to the gate means for the tubes 30 is fixed to the upper end of the housing 231 and its operating elements are referred to by the same, but double primed, reference characters. Thus, a bellcrank 96″ (FIG. 19) is pivoted on a horizontal pin 102″ and has a blocking finger 99″ disposed in a blocking position (FIG. 18) in the groove 232 upon downward movement of the vertical rod 108″ as the latter is depressed by the actuator plunger 238 (FIG. 17). An upper offset arm 118″ (FIG. 18) on the bellcrank engages the collar 116″ to force the holding pin 98″ out of the groove 232 while compressing the spring 115″ to release a cap to drop to the blocking finger. When plunger 238 is retracted, the bellcrank 96″ turns in a clockwise direction under action of spring 112″ and a cap is dropped and at the same time pin 98″ moves into position to support the rest of the caps against downward movement.

In order to orient the caps with their open ends down, means are provided in the housing 231 in the forming of a swinging arm 239 (FIG. 18) having a vertical finger 240 to receive in a telescoping relationship a cap 34 passing open end down through a slot 241 formed in a turntable disc 242. The arm 239 then swings through 90° along arc a–b to shed the cap 34 off the finger 240 and allow it to drop into place in table 254, the groove 232 keeping the cap in a vertical position as it comes off finger 240 and drops into the receptacle 255 in table 254 (FIG. 6). Caps coming down with their closed ends down, however, abut their closed ends on the upper end of the finger, as shown in FIG. 19, and then, after the disc 242 turns through 180°, as seen in FIGS. 20 and 21, these caps drop directly from disc 242 into receptacles 255, arm 239 and finger 240 swinging out of the way as the disc 242 turns. The disc is fitted in a circular seat in the housing and is journalled for turning on a horizontal pin 244, which is journalled for rotation in the housing 231. Fixed to the pin 244 is a gear 245 (FIG. 17) meshed with an idler gear 246 rotatably mounted on a horizontal shaft for meshing engagement with rack teeth on one side of a vertically reciprocable rack 248. The latter is fixed to the lower end of the vertical rod 108″ for reciprocation in the movement of the actuator plunger 238. A coiled, compression spring 249 (FIG. 17) encircles a rod fixed to the lower end of the rack in coaxial relationship to rod 108″ and returns the vertical rod 108″ and rack 248 upon upward movement of the actuating plunger 238. To swing the arm 239 carrying the finger 240, the arm 239 is fixed to a rock shaft 250 journalled for rotation in the housing 231. A gear 251 is fixed to the rock shaft and is meshed with rack teeth 252 on the adjacent side of rack 248, so that in the vertical movement of the rack 248 the disc 242 is turned through 180° and the gear 251 turns the shaft 250 at the same time and swings the arm 239 through approximately 90° to shed a cap that might have come open end down onto finger 240.

The table 254, as seen in FIG. 6, is formed with a series of receptacles 255 about its outer rim and is journalled for indexing about a vertical axis on a shaft 256 extending downwardly through a vertical support base 258 fixed to the upper side of the main frame plate 65. A gear 259 is fixed to the lower end of the vertical shaft 256 and is meshed with an idler gear carried on the support 260 and driven by the main drive gear 68. The caps in the indexing of table 254 in timed relation to table 40 are brought into position directly over the top of a tube 30 on the table 40 and are pressed onto an alined tube by an actuator plunger 261 (FIG. 6) of the main actuator 51. The caps when inserted into holders 255 are releasably held on one side by a leaf spring (not shown) until forced from a receptacle 255 through aperture 262 in the bottom wall of the table by the plunger 261 and pressed onto the upper ends of tubes 30.

The completely assembled applicators are discharged from the table 40 at a discharge station 264 (FIG. 3) through a discharge chute 265 into a container 266. At the discharge station, a gap is formed between spaced ends 268 and 269 of the ring 62 so that the tubes 30 in the receptacles 39 are free to be moved generally radially from the table 40 into the chute 265 leading to the container. The tubes are forced off the table by the inner end of a plate 270 which extends into the space between the discs 60 and 61 for the table and cams the tubes to move into the space between it and a companion parallel plate 271 constituting the chute 265. At this discharge point the applicators in passing a limit switch arm (not shown) register each one on an electrically operated counter C (FIG. 2) so that the output of the machine is accurately counted automatically.

In conclusion, the shaft 56 is given reciprocation in timed relation to the indexing of the table 40 by means of a pitman rod 272 driven by a pin 273 eccentrically disposed to wheel 274 turning with gear 188. The tables 40, 196 and 254 are all turned together in the proper relationship by the gearing previously described, and are indexed by suitable Geneva gear means (not shown) between the upstrokes and downstrokes of actuator 51 with shaft 56.

To aid in the understanding of the invention a brief description of operation follows. It will be understood that the various assembling operations at the respective stations are taking place simultaneously and to different ones of the tubes. Specifically, as the turntable 40 advances, one tube 30 is being deposited in a receptacle 39 at the station 37, one ampule 31 is being inserted into a tube 30 at the station 41, a swab 32 is being projected into another tube at the swab forming and inserting station 44, a swab 32 is being wetted by acetone in still another tube at station 50 for cementing to the tube lining, and still another tube is receiving a cap 34 at station 46, while a finished applicator is being ejected into the discharge chute 265 at the discharge station 264. For purposes of clarity, however, the operation is described on a single tube hereinafter as it advances to and through the various assembly stations.

The tube 30 in the supply hopper 38 is vibrated to move along a supply track in the hopper and down through the hose 85 to the gating means in the housing 86. The holding pin 98 of the gating means holds the tube 40 and those thereabove until the actuating plunger 119 engages the vertical rod 108 (FIG. 10) and swings the bellcrank stop finger 99 into the blocking position while forcing the holding pin 98 to release the tube 40 to drop onto the stop finger. When the actuating plunger 119 is moved upwardly, the finger 99 moves to its release position and the tube 40 drops onto the vertical finger 122. If the open end of the tube is down, the tube telescopes on the finger. If the closed end of the tube is down, the tube rests on the upper end of the finger. In either event, on a subsequent movement of the actuating plunger 119 and rod 108, the finger 122 turns through 180°, whereby this tube is dropped through the outlet passageway to fall into a receptacle opening 39 in the turntable 40.

The tube 30 advances to the vial depositing station 41, and a vial 31 is released by a stop finger 99' of a bellcrank 96' of the gate means 136 which is connected by flexible tube 135 to the supply hopper 42 for the vials. The plunger 144 operates the bellcrank 96' to release one vial at a time, for depositing the same into the respective ones of the tubes passing therebeneath.

The turntable 40 continues to index and advances the tube 30 to the swab station 44. When the tube is disposed beneath the sleeve 195 carrying a swab 31, the actuator plunger 199 engages the upper end of the piston 201 and forces the sleeve to telescope over the tube and the piston to eject the cylindrical swab into the open end of the tube. After receiving the swab, the tube advances to the acetone applying station 50 where an actuator plunger 222 (FIG. 6) operates a shut-off valve 49 to release a metered amount of liquid acetone to the swab, the acetone being a solvent for rendering tacky the acetone lining 35 in the tube. The acetone dries quickly and causes the swab 32 to adhere firmly to the tube 30.

The table 40 advances the swab containing tube to the capping station 46 at which the cap 34 is forced by an actuating plunger 261 through an aperture 262 in the table 254 and is pressed onto and telescoped over the upper end of the tube. The capped tube is advanced to the discharge station 264 at which the applicators move into the discharge chute 265 leading to the container 255 disposed to receive the completely assembled applicators. Counting device 219 or its equivalent serves to keep an accurate record of the number of applicators assembled.

From the foregoing it will be seen that the applicators are quickly and readily assembled in an apparatus consuming relatively little floor space. The timed relationship of the operations of the various mechanisms at the respective stations is afforded by a simple mechanical actuator 51 having a plurality of angularly and radially spaced plungers on radial arms 52 extending to the mechanisms disposed about the circumference of the table 40.

Also from the foregoing it will be seen that cylindrical cotton swabs 32 are formed in an automatic continuous manner as the pieces therefor are cut one after another from a strip or tape of flat cotton material.

While the present invention has been described in accordance with its preferred embodiment, the invention should not be construed as being so limited but rather is intended to embrace other embodiments falling within the spirit and scope of the appended claims.

We claim:
1. In a machine for assembling a medicinal applicator having a tube that is closed at one end and contains a frangible ampule of medicine covered by an absorbent swab protruding from the open end,
   means including a rotatable table for receiving a plurality of circumferentially spaced tubes,
   means for rotating the table between successive stations spaced circumferentially about the table to advance the tubes about a circular path,
   means at a first station for feeding a tube to a position over the circular path and for depositing a tube with an open end up on said table,
   means at a second station for feeding an ampule to a position over the circular path and for inserting ampules one by one into said tubes as the latter are advanced through the second station,
   means at a third station for feeding swabs to a position over the circular path and for inserting the swabs one by one into the open ends of said tubes, and
   means at a discharge station for discharging said assembled applicators from said table.
2. The machine of claim 1 in which a dispensing means is provided at a station to dispense a metered quantity of a liquid to the swab to cement the swab to the tube.
3. The machine of claim 1 in which the tubes have a dry adhesive lining, the machine including means at one station for dispensing a liquid solvent for said adhesive onto each swab to cement the swab to the tube by wetting said lining.
4. The machine of claim 1 in which the feeding and depositing means at the first station includes a chute in which the tubes are alined end-to-end in a column, and further includes means to turn the tubes having their closed ends up through 180° to dispose the tubes with their open ends up for depositing on the table.
5. A machine as set forth in claim 1 wherein each applicator includes a tubular cover closed at one end and fitting over the tube in telescoping relationship thereto enclosing the swab, the machine including cover feeding and applying means operated in timed relationship to the other means recited.

6. The machine of claim 5 in which the feed and applying means for the covers includes a chute in which the covers are alined end-to-end, and further includes means to turn the covers having their open ends up through 180° to dispose the covers with their open ends down for telescoping on a tube.

7. In a machine for assembling medicament applicators each consisting of a tubular body closed at one end, a frangible vial therein of generally cylindrical form containing a liquid medication, and a swab entered in the open end of the body and protruding therefrom, said machine comprising the combination of, a rotatable turntable disposed for turning about a vertical axis and for advancing the bodies in timed relationship to and through assembly stations to receive first the vial and then the swab, a plurality of feed means spaced circumferentially about the turntable for feeding to the turntable in timed relationship the bodies, vials, and swabs, and an actuator movable vertically relative to the table and having a plurality of radially extending arms spaced circumferentially and vertically to operate the respective feed means in timed relationship to the table advancement in its vertical reciprocation.

8. The machine of claim 7 in which the respective feed means include hoppers for holding quantities, respectively, of the bodies and vials, and further include a gate means in each feed means for releasing their respective elements one at a time, the arms of the actuator extending to and operating said gate means to release the elements one by one.

9. A machine as set forth in claim 7 wherein each applicator includes a tubular cap closed at one end and fitting over the tubular body in telescoping relationship thereto enclosing the swab, the machine including cap feeding and applying means operated in timed relationship to the other means recited.

10. The machine of claim 7 in which the bodies have a dry adhesive lining, the machine including means for dispensing a liquid solvent to the swab for activating the adhesive to cause adhesion of the swab to the body, and further including an arm on said actuator for operating said dispensing means.

11. The combination of claim 7 in which the turntable for advancing the tubes includes a plurality of spaced discs rotatably and coaxially mounted and having vertically alined grooves in the peripheral edges, and a lower bottom disc rotatably and coaxially mounted with the other discs for supporting the closed ends of the tubes, and an outer rim substantially encircling the discs and disposed vertically adjacent the discs to support the tubes against falling radially from the grooves until they arrive at a discharge end of said rim.

12. A machine as set forth in claim 1, wherein the means at the third station for feeding and inserting the swabs comprises a reel support for a supply reel on which is wound a flat strip of absorbent material such as cotton, means to feed the strip forwardly a predetermined amount, means to sever a piece from the leading end of the cotton strip, a plunger disposed on one side of the severed piece and movable vertically to engage a central portion of the severed piece, a former disposed on the other side of the severed piece and having a bore to receive the plunger and the strip to form the flat piece into a generally cylindrical shape about the plunger, and means to eject the cylindrically formed piece from said bore.

13. The structure as set forth in claim 12 in which a plurality of formers are provided, each for forming and holding a cylindrically formed piece of cotton, and a transfer table which supports the formers and indexes to transfer the cylindrical pieces from a position at the plunger to an angularly spaced position for ejectment from its former.

14. The structure as set forth in claim 13 in which the formers include a sleeve having a central bore for receiving the plunger at one end, and the ejecting means includes a piston reciprocable in the sleeve bore and disposed on the side of the cylindrical piece opposite the plunger.

15. The structure as set forth in claim 14 in which a first spring holds the former sleeve at an elevated position above the upper end of a tube, and a second and stronger spring is disposed between the piston and the former sleeve so that a force applied to the piston first causes a telescoping movement of the sleeve about the tube and then causes a downward movement of the piston in the tube to eject the cylindrical piece.

16. The structure as set forth in claim 12 in which the feeding means for the strip is a pawl and ratchet mechanism which feeds the strip forwardly in intermittent steps, and in which the severing means includes a pair of pivotally mounted blades movable together to sever the piece from the strip, and in which the combination includes means for swinging the blades to sever the strip between successive feeding operations of the pawl and ratchet mechanism.

17. A machine as set forth in claim 1 wherein the means at the first station for feeding and dropping tubes one by one to the table comprises a vibratory hopper having a chamber for holding a large number of said tubes in random orientation and a track for delivering a continuous stream of said tubes disposed end-to-end, a chute having an inlet end for receiving the tubes from the track, said chute being curved downwardly to deliver the tubes resting end-to-end within the chute at an outlet end, a housing having a vertically disposed channel connected to the outlet end of the chute to receive the tubes, a holding pin biased to insert one end into the channel and hold a tube against dropping and retractable from the channel to a release position, a bellcrank having a portion movable from a release position out of the path of tube travel to a blocking position in which said bellcrank portion blocks downward movement of a tube, and actuating means to retract the holding pin to its release position and to move the bellcrank to its blocking position, said actuating means adapted on a subsequent operation to move the holding pin to its holding position and to move the bellcrank to its release position, whereby tubes are released one by one to the table.

18. The structure as set forth in claim 17 in which the actuating means includes a vertically movable rod connected to the bellcrank to turn the same, a spring to bias the rod and the bellcrank to dispose the latter normally in the release position, a further spring to bias the holding pin normally to its release position, and an actuating portion on the bellcrank engageable with the holding pin to move the latter to its release position when the bellcrank is turned by said rod.

19. The structure as set forth in claim 17 in which the tubes are closed at one end, and the bellcrank includes a projection adapted to enter the bores of the tubes when fed thereto open end down, said bellcrank being rotatable from blocking position through 180° to release position to drop the tubes off said projection open end up.

20. A machine as set forth in claim 1, wherein the tube feeding means comprises an inlet chute for conveying tubes downwardly, a finger mounted for turning from a first position for projecting into the open end of a tube moving downwardly thereto with its open end down to a second position in which the finger points down and releases the tube with its open end up, means to turn the finger and the telescoped tube from the first position to the second position and then return the finger to its first position to receive or block movement of another tube, and an outlet chute for receiving the tubes delivered with their closed ends down, said tubes in the inlet chute with their closed ends down being blocked by the finger until it turns toward the second position, whereby the tube drops down past the turning finger to the outlet chute.

21. The structure as set forth in claim 20 in which a chamber is provided between the inlet and outlet chutes, and in which a divider in the chamber forms two channels each leading to the outlet chute, the tubes leaving the inlet chute with their closed ends down dropping through one channel and the other tubes with their open ends down being turned by said finger and dropping through the other channel to the outlet chute.

22. The structure as set forth in claim 20 in which a series of tubes are disposed end-to-end in said inlet chute and in which a gate means is operable to release the tubes one by one to drop to the finger.

23. The structure as set forth in claim 22 in which the inlet chute and the other channel are offset from the axis of rotation of the finger, and in which said finger is also offset from said axis and is vertically alined with the inlet chute when the gate means releases a tube.

24. A machine as set forth in claim 5, wherein the tubular cover feed means comprises an inlet chute for conveying covers downwardly with either end up, a finger mounted for swinging from a first position in a vertical guide projecting vertically upwardly in the guideway into the open end of a cover moving downwardly thereto in the guideway with its open end down to a second or retracted position outside the guideway having shed the cover therefrom in the guideway to drop open end down, the finger while in the guideway serving to block covers moving downwardly thereto with the closed end down, a rotary device turning on a horizontal axis and disposed above said finger having a diametrically extending guideway which in a vertical position receives a cover when blocked by said finger and turns the same through 180° to drop open end down through said guideway while said finger is retracted relative to said guideway, and means to turn said rotary device and swing said finger in timed relationship to one another.

25. The structure as set forth in claim 24 in which a series of covers are disposed end-to-end in the inlet chute and in which a gate means is operable to release the covers one by one to drop to the rotary device.

26. In a machine for assembling medicament applicators consisting of a tube closed at one end, a frangible cylindrical vial disposed in the tube and containing liquid medication, and a swab entered in the open end of the tube, said machine comprising the combination of a rotatable turntable disposed for turning about a vertical axis and for receiving a tube and advancing the same to and through successive assembly stations located and spaced circumferentially of the turntable, a vibratory hopper having a chamber for holding a large number of tubes in random orientation and having a track for delivering a continuous stream of tubes disposed end-to-end, a gate and orienting means receiving the tubes for the vibratory hopper and for orienting all of the tubes to have their closed ends down and releasing the tubes one by one to the turntable, a vibratory hopper at a subsequent station for holding a large number of vials and having a track for delivering a continuous stream of vials disposed end-to-end, a gate means for releasing and dropping a vial in each tube as the turntable advances the tube beneath the gate means, means at a swab forming station to feed and sever a flat strip of absorbent material from a supply roll, a plunger and former cooperating to form the strip into a cylindrically shaped swab, means for transferring the swab to a position over the open end of a tube and inserting a cylindrical swab into the tube, and an actuator movable vertically relative to the table and having a plurality of radially extending arms spaced vertically and circumferentially to operate the respective gate means and orienting means in timed relationship to the advancement of the table.

27. A machine as set forth in claim 26 wherein each applicator includes a tubular cap closed at one end fitting over said tube telescopically to enclose said swab, the machine including means at a capping station for feeding a plurality of caps into an end-to-end relationship, gate and orienting means receiving the caps from the feed means and orienting each of the caps with its open end down and moving the caps one by one onto a tube advanced through the capping station, said cap feeding and related gate and orienting means being also operable by arm means on said actuator.

References Cited

UNITED STATES PATENTS 2,698,478   1/1955   Heisterkamp et al.
2,841,937   7/1958   Miskel et al.
3,043,416   7/1962   Weller.

THOMAS H. EAGER, Primary Examiner

U.S. Cl. X.R.

29—211